United States Patent
Vegge

(10) Patent No.: US 7,243,164 B2
(45) Date of Patent: Jul. 10, 2007

(54) PERSONAL MOBILE INTERNET

(75) Inventor: Sverre Vegge, Grimstad (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 824 days.

(21) Appl. No.: 10/312,844

(22) PCT Filed: Jul. 6, 2001

(86) PCT No.: PCT/SE01/01589

§ 371 (c)(1),
(2), (4) Date: Jan. 2, 2003

(87) PCT Pub. No.: WO02/05586

PCT Pub. Date: Jan. 17, 2002

(65) Prior Publication Data

US 2003/0174683 A1    Sep. 18, 2003

(30) Foreign Application Priority Data

Jul. 7, 2000    (NO) ................................. 20003521

(51) Int. Cl.
  *G06F 15/16* (2006.01)
  *H04L 12/28* (2006.01)
  *H04L 12/56* (2006.01)

(52) U.S. Cl. ................. 709/252; 370/408; 709/203

(58) Field of Classification Search ........ 709/201–253; 705/1–45, 50–80; 379/102.01, 102.05, 106.01, 379/106.03; 370/401, 405, 408

See application file for complete search history.

(56) References Cited

U.S. PATENT DOCUMENTS 6,107,961 A * 8/2000 Takagi ................. 342/357.13
6,161,008 A * 12/2000 Lee et al. ................. 455/415
6,332,127 B1 * 12/2001 Bandera et al. ............. 705/14

(Continued)

FOREIGN PATENT DOCUMENTS

| DE | 198 19 582 A1 | 11/1999 |
| EP | 1 045 609 A1 | 10/2000 |
| WO | 99/27742 A1 | 6/1999 |
| WO | 00/04730 A1 | 1/2000 |
| WO | 01/13069 A1 | 2/2001 |

OTHER PUBLICATIONS

3GPP, "The Virtual Home Environment", 3 TS 22.121, version 1.2.0, (Apr. 1999).

(Continued)

*Primary Examiner*—David Wiley
*Assistant Examiner*—George C. Neurauter, Jr.
(74) *Attorney, Agent, or Firm*—Nixon & Vanderhye, P.C.

(57) ABSTRACT

A client-server based system for providing location related information and services to mobile users is disclosed. A plurality of servers, wherein a server is a provider of information and services related to a specific predefined geographical coverage area, operate in a tree-shaped network. An operating mobile client, preferably operating in a mobile phone or PAD of a mobile user, establishes upon connection to the network an association, based on client location information, with one server at a time. A server association can be transferred from one server to another on an existing network connection as the user relocates from one server coverage area to another, and a user profile stored with the client or a special user profile server is applied to the standard user interface in the current server to provide the client with a personal user interface adapted at any time to the requirements of the user and to the information and/or services available at the current server.

9 Claims, 19 Drawing Sheets

U.S. PATENT DOCUMENTS

| | | | |
|---|---|---|---|
| 6,496,575 B1 * | 12/2002 | Vasell et al. | 379/102.05 |
| 6,553,310 B1 * | 4/2003 | Lopke | 701/213 |
| 6,577,714 B1 * | 6/2003 | Darcie et al. | 379/93.17 |
| 6,677,858 B1 * | 1/2004 | Faris et al. | 340/573.1 |
| 6,677,894 B2 * | 1/2004 | Sheynblat et al. | 342/357.1 |
| 6,751,459 B1 * | 6/2004 | Lee et al. | 455/445 |
| 6,944,679 B2 * | 9/2005 | Parupudi et al. | 709/246 |
| 6,975,619 B1 * | 12/2005 | Byers et al. | 370/351 |
| 6,988,104 B2 * | 1/2006 | Kootale | 707/100 |
| 7,076,243 B2 * | 7/2006 | Parupudi et al. | 455/414.1 |
| 7,076,255 B2 * | 7/2006 | Parupudi et al. | 455/456.1 |
| 2004/0139049 A1 * | 7/2004 | Hancock et al. | 707/1 |

OTHER PUBLICATIONS

Farjami et al, "A Mobile Agent-Based Approach for the UMTS/VHE Concept", Aachen University of Technology, German, Nov. 1999.

Hartmann, "Financial Services for the Future—Mobile, Flexible, and Agent-Based", Aug. 10, 1999.

International Search Report mailed Oct. 31, 2001.

International Preliminary Examination Report completed Jun. 4, 2002.

* cited by examiner

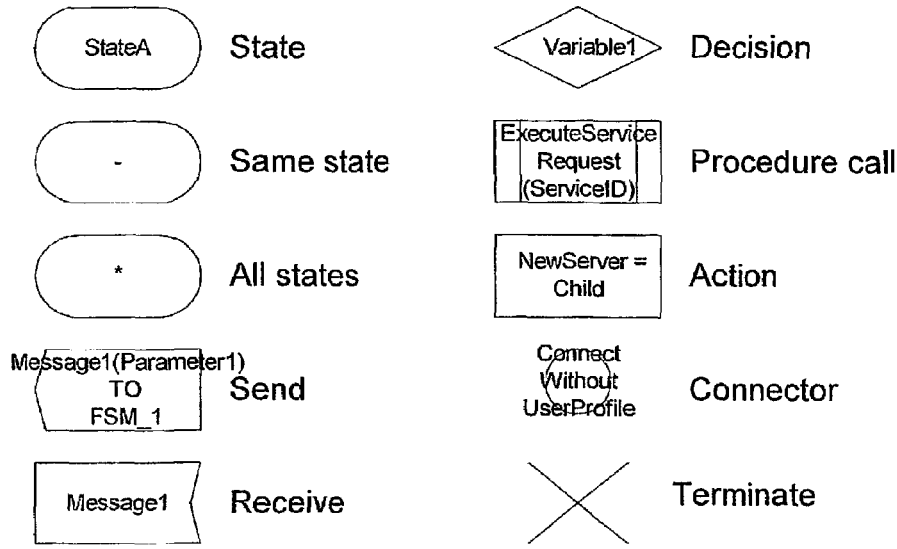

| Meaning of the SDL symbols in this context. ||
|---|---|
| State | State |
| Same state | The transition will not result in going to a new state |
| All states | This symbol is used for signals that can be received in all states in the final state machine (FSM) |
| Send message | Send message TO a FSM |
| Receive | Receive a message |
| Decision | Check the value of a variable in order to swith to a different execution thread |
| Procedure call | Call a procedure with optional return value and parameters |
| Action | Assign a value to a variable |
| Connector | Used to connect transitions in order to simplify the drawings |
| Terminate | Terminate the FSM |

Figure 1

```
{
 {
  (1,1,0," Transport" ),
  (1,1,1," Taxi" ),
  (1,1,2," Train" ),
  (1,1,3," Bus" ),
  (1,1,4," Aeroplane" )
 },
 {
  (1,2,0,0," Entertainment" ),
  (1,2,1,0," Cinema" ),
  (1,2,2,0," Theatre" ),
  (1,2,3,0," Music" ),
  (1,2,3,1," Concerts" ),
  (1,2,3,2," Musicals" )
 },
 {
  (1,3,0 " Food" )'
  (1,3,1," Door delivered" ),
  (1,3,2," Restaurants" ),
  (1,3,3," Fast food" ) ,
  (1,3,4," Food stores" )
 }
}
```

```
{
  {
    (1,1,0," Transport" ),
    (1,1,1," Taxi" ),
    (1,1,2," Train" ),
    (1,1,3," Bus" ),
    (1,1,4," Aeroplane" )
  },
  {
    (1,3,0 " Food" )'
    (1,3,1," Door delivered" ),
    (1,3,3," Fast food" ),
    (1,3,4," Food stores" )
  }
}
```

```
{
  {
    (1,1,0," Transport" ),
    (1,1,1," Taxi" ),
    (1,1,2," Train" ),
    (1,1,3," Bus" )
  },
  {
    (1,2,0,0," Entertainment" ),
    (1,2,1,0," Cinema" ),
    (1,2,2,0," Theatre" ),
    (1,2,3,0," Music" ),
    (1,2,3,1," Concerts" ),
    (1,2,3,2," Musicals" )
  },
  {
    (1,3,0," Food" ),
    (1,3,1," Door delivered" ),
    (1,3,2," Restaurants" ),
    (1,3,3," Fast food" ),
    (1,3,4," Food stores" )
  }
}
```

```
{
  {
    (1,1,1),
    (1,1,4)
  },
  {
    (1,2,1,0)
  },
  {
    (1,3,0),
    (1,3,2),
    (1,3,3),
    (1,3,1)
  }
}
```
Figure 19
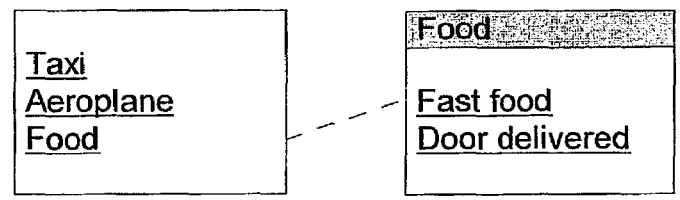
Figure 20
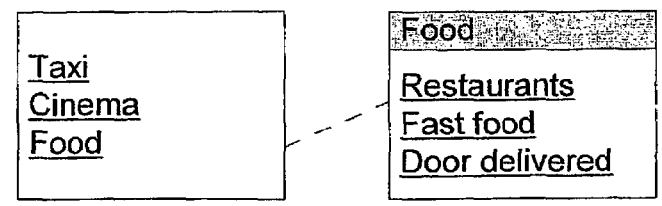
Figure 21

PERSONAL MOBILE INTERNET

This application is a national stage application of international application PCT/SEO1/01589 filed 6 Jul. 2001 which designates the U.S.

FIELD OF INVENTION

The invention relates to the field of information and service systems based on client-server applications, wherein networked servers provide information or services to a mobile user by means of a mobile client. In particular, the client, intended to run in a mobile phone or PDA, provides a personalised user interface for requesting and providing information by a user. The server application comes in the same category as WAP or WWW servers. The system including the novel server-client provides the Personal Mobile Internet (PMI).

BACKGROUND

SDL design is used to clarify and describe the client-to-server, server-to-client and server-to-server communication. A SDL design makes possible the wide use of simplifications and must not be seen as a real design but as a way to explain the principles of the invention.

A more detailed explanation of the terms and symbols used in the SDL design descriptions and examples are given in the accompanying FIG. 1.

The WWW and WAP are both technologies that give the user easy access to information and services via the Internet. In WWW and WAP the servers do not co-operate in a distributed manner. In fact they are not aware of each other. This means that the user has to know the specific address to the information/service he wants to get from the server. These addresses can be saved as bookmarks. In practice the user spends a lot of time to find the information and services he wants.

Companies that provide WWW and WAP portals have solved the problem to some extent. These portals works like an index or a table of content to information and services on the Internet.

There is a significant difference between the "fixed" Internet user and the mobile Internet user.

The mobile Internet user wants:
Services based on his current or other specified geographical location;
Fast access to services and information through a personalised interface;
The ability to filter information and choose services based on his personal requirements.

The providers of information and services want:
To provide their information and services for users within a specific geographical area;
To provide their information and services in a way that makes them easy to access for the target group of users;
An easy technical way to keep their information and services updated.

These requirements are not fulfilled with the technology available today. Servers need to be connected in order to provide specific location dependent services to a user that moves around.

"The Virtual Home Environment" (3G TS 22.121) is quite close to this idea with regards to the user profile and the functionality seen from the users perspective. However, it does not say anything about servers and network.

The latest improvement to the WWW portals is that the user can make his own portal based on a selected subset of the hyperlinks from the standard portal. This feature provides a user-friendlier interface than his bookmarks, which is really the same thing.

Different kinds of positioning technology are available or are being developed. There is work being done to provide the mobile Internet user with information and services based on his location. As far as the applicant knows, these are services which are not specified as part of a general network solution.

The current solutions for location dependent information and services are not part of a general solution that fulfils the requirements stated above.

The portals available today are static. The information level is quite high because they cover big geographical areas. This means that small information/service providers may not be allowed to "hook on" to these portals, or they can simply not afford it.

The location dependent services that are popping up today must be organised in a network to make them easy to access for the user.

With reference to the limitations of the prior art referenced above, it is an object of the invention to provide a flexible and affordable information system for providing location dependent information and services according to predefined needs of a mobile user and the needs of the information and service providers.

It is a further object of the present invention to alleviate the mobile user of location specific information and services of the tedious task of searching through the huge amounts of information and services available on the Internet in order to find information and services of interest.

BRIEF SUMMARY

Servers providing location dependent information and services are connected in a specific manner to provide the user with a dynamic personalised interface to the information and services.

BRIEF DESCRIPTION OF THE DRAWINGS

In the following, the invention will be explained by way of examples and with reference to the accompanying drawings, where:

FIG. 1 gives an overview of the terms and symbols used by SDL;

FIG. 19 shows an example of the Personal user interface, being part of the exemplary user profile for a person X;

FIG. 20 shows an example of the User interface generated by server B as it will appear on the client for the person X; and FIG. 21 shows an example of the User interface generated by server C as it will appear on the client for the person X.

NETWORK TOPOLOGY

Figure 2:
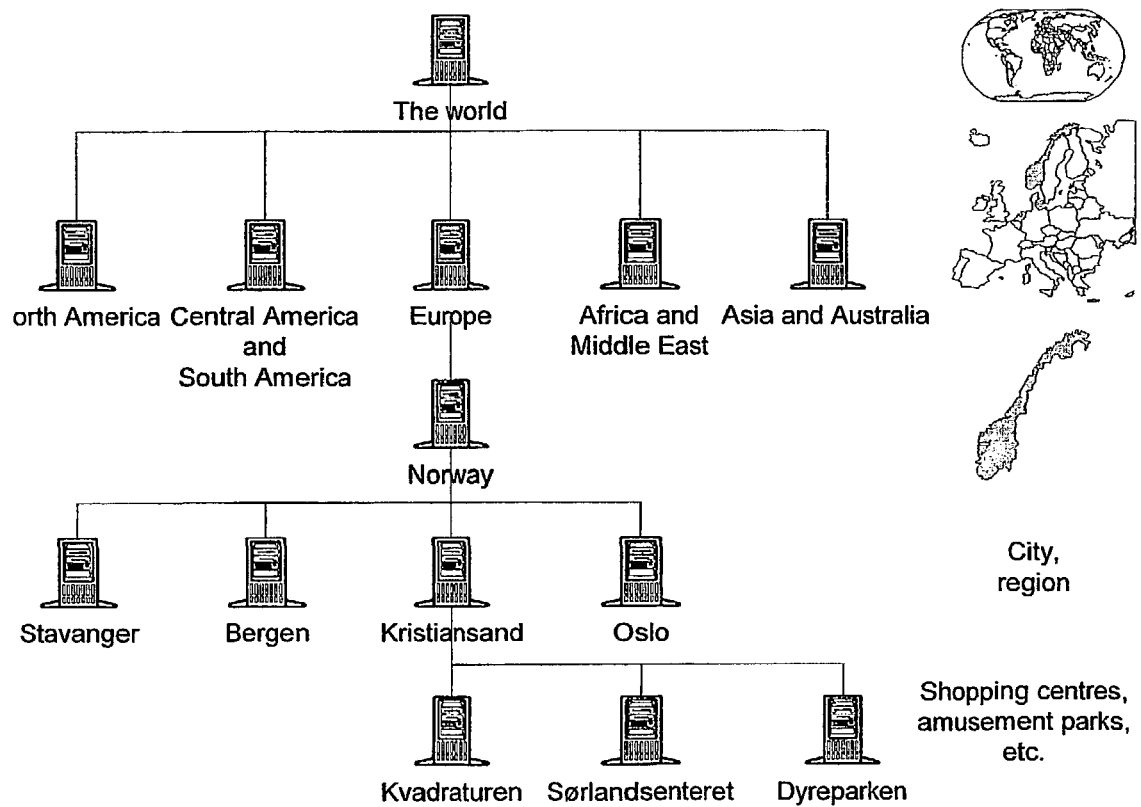
FIG. 2 illustrates an example embodiment of a network of servers in a PMI system.

The servers in an example system according to the technology are connected in an hierarchical ordered tree network. The system may comprise servers at the root, the branch nodes, and at the leaves of the tree. Accordingly, in a system of networked servers one may find one root server, a plurality of node servers, wherein each node server has one parent server and one or more child server(s), and a plurality of leaf servers that have no child servers. An example of such an arrangement is depicted in FIG. 2.

User Profile

The user profile holds user specific information and settings. PMI servers use the user profile to configure a session between a client and a server. Below is an example of user profile contents:

| | |
|---|---|
| UserID | = User Identification |
| Name | = User name |
| Phone number | = telephone number of mobile device |
| Personal user interface | = {<user interface>} |

In PMI, the most important information in the user profile is the last of the items listed immediately above, namely, a reference to the personal user interface, or, alternatively, information required to configure the personal user interface, or the personal user interface itself.

There are two ways of providing a server with the user profile. This depends on where the user profile is stored:

1. The user profile can be stored in the client and is sent to the server during the connect procedure.
2. The user profile can be stored on a special user profile server. When a client connects to a server, the user must enter a valid user ID and password to enable use of the user profile associated with that particular user. The server uses this information to obtain the complete user profile from the user profile server.

Standard User Interface

Generally, there is one standard basic user interface that applies for the whole network of servers. This user interface is intended to cover any location dependent information and services that apply for the geographical area covered by the entire network.

The servers in the network are intended to implement the actual services behind the standard user interface. The services can vary in functionality and availability depending on which server the client is co-operating with, and hence typically on information about the location of the user. The user chooses a subset of the user interface that applies for the PMI client running on his mobile device. This subset is referred to as the personalised user interface, and is stored in the user profile. When the user moves from one coverage area to another, the server that the user's client at any time is automatically or statically connected to will provide the services that are available through the user's personalised user interface.

The standard user interface is hierarchical and generally menu-like. The top-level menus are very general and contain typically a number of sub-menus.

In the following, and by way of example, the menu structure of a user interface will be explained:

If PMI is based on WWW or WAP, the personal user interface will typically be generated on the particular server as WWW or WAP pages based on the user profile settings. The user can then simply click on hyperlinks to interact with the server.

Note that throughout the rest of this document, service requests are explained in a more abstract way than simply clicking on a hyperlink in order to keep the description of PMI independent of any underlying protocols.

There are no specific requirements put on the layout and/or implementation of the services behind the menu items in the personal user interface. However, within a particular network implementing the PMI, a common hierarchical structure will be used by all servers in the network. Accordingly, with reference to the personalised user interface menu example to be described below with reference to FIGS. 15–21, the taxi (1, 1, 1) menu item may lead to a WWW or WAP page showing a list of phone numbers or an automatic ordering service.

Figure 15:
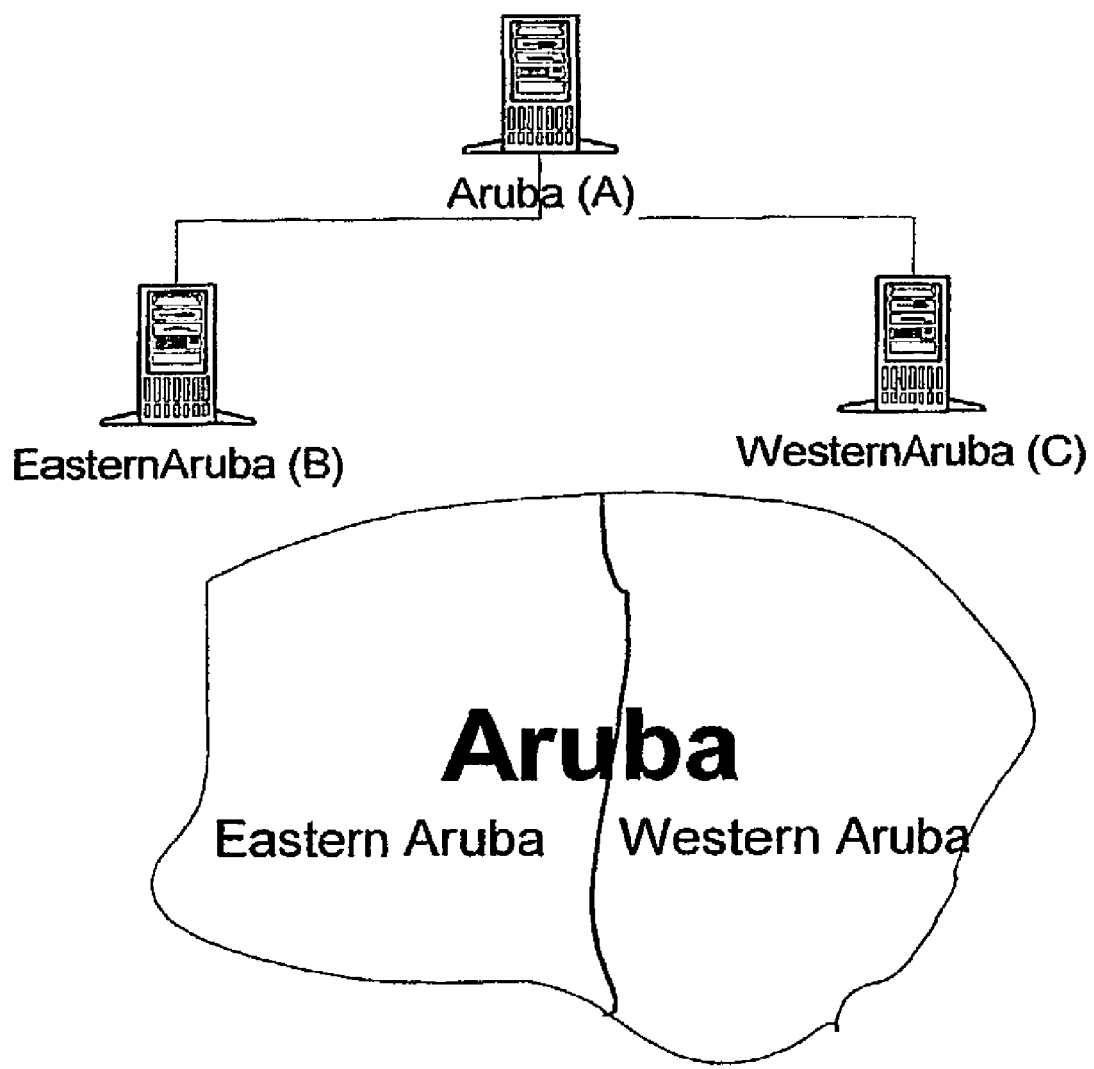
FIG. 15 depicts an exemplary network ("the Aruba PMI network") providing PMI.
Figure 16:
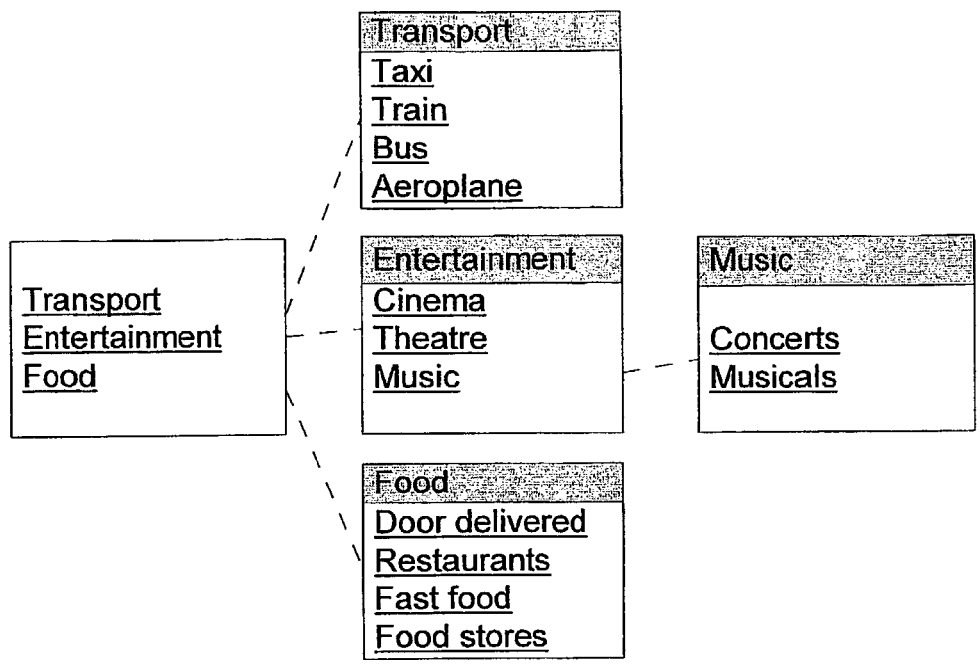
FIG. 16 shows a typical user interface example for the network in FIG. 15.
Figure 17:
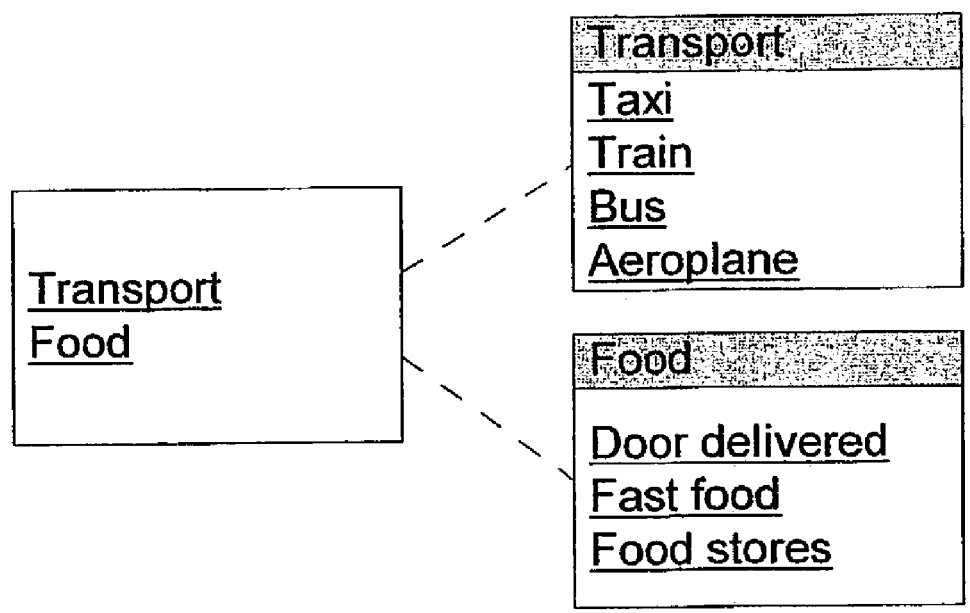
FIG. 17 shows an example of the subset of the standard user interface implemented by server B of the network in FIG. 15.
Figure 18:
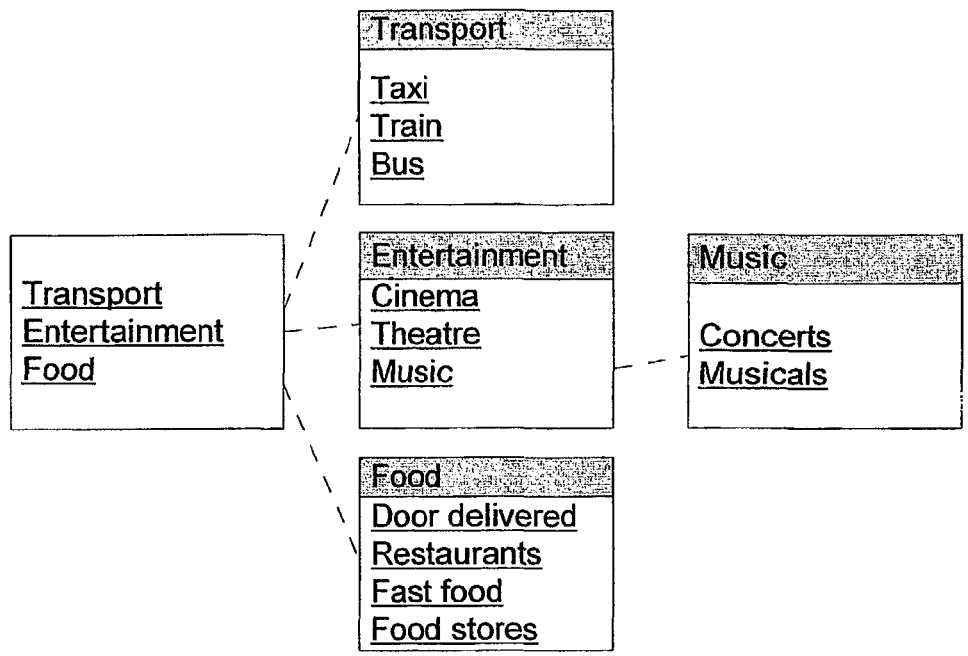
FIG. 18 shows an example of the subset of the standard user interface implemented by server C of the network in FIG. 15.

By way of the following example, referring to FIGS. 15–21, various mechanisms in PMI are described in a simplified manner:

1. The geographical area covered by the entire PMI network is also the coverage area of the root server. The root server may not provide any services at all as long as its coverage area is entirely divided in cells covered by other PMI servers. Accordingly, FIG. 15 shows a possible PMI network example, the "Aruba PMI network", which consists of three servers; the root server (C) and two leaf servers (A and B). The leaf servers cover the entire coverage area of the root server. This means that a client will always be connected to server B or server C. Server A will act as a router.
2. When setting up a PMI network, the standard user interface must be defined for the whole network. FIG. 16 shows a very small standard user interface that applies for the PMI network shown in FIG. 15.
3. Each server in a PMI network implements a subset of the standard user interface. FIG. 17 shows the subset implemented by server B and FIG. 18 shows the subset implemented by server C.
4. FIG. 19 shows an example of a personal user interface, which is part of the user profile for user X.

5. When a user is connected to a server, or handed over to a server, this particular server will create a user interface, which is downloaded to the client. The server creates this user interface by applying the personal user interface (part of the user profile) to the subset of the standard user interface that the server supports. Unsupported menus are simply ignored.
6. Server B will generate the user interface shown in FIG. 20 for user X, while server C will generate the user interface shown in FIG. 21 for user X.

There are no specific requirements on the layout/implementation of the services behind the menu items in the user interface generated for a specific client/user. Accordingly, with reference to the personalised user interface menu example described above with reference to FIGS. 15–21, the taxi (1, 1, 1) menu item may lead to a WWW or WAP page showing a list of phone numbers or an automatic ordering service. However, the menu items that are part of standard user interface are sorted in a specific order which must be followed. The menu item names must also be used unchanged. The user can customise his personal user interface. He may decide to reorder the menu items on a specific sub-tree level, or move menu items/sub-trees to a higher level in the tree. This is shown in FIG. 19 where (1,1,1), (1,1,4) and (1,2,1,0) has been moved to the top. The menu items under sub-tree (1,3,0) have been reordered.

Standard User Interface Versions

The standard user interface will probably be updated sometimes. A new version of the standard user interface will be compatible with previous versions if the new version has been made by
1. Adding new menu items using new menu item identifiers
2. Menus have been removed (not replaced!)
3. Moving an existing menu has been done using 1 and 2

If the steps 1–3 above are followed, servers are compatible even if they support different versions. The same applies for user profiles based on different versions.

Methods for upgrading servers and user profiles with new standard user interface versions is an implementation issue.

Personal User Interface

The personal user interface is a subset of the standard user interface. This subset is part of the information held in the user profile.

As an example of setting up a personal user interface, the most user friendly way to set up the personal user interface is to use a PC or work station. A WWW server can be set up providing a service for making the personal user interface. The user can simply select the menu items he wants and modify the corresponding properties. After creating the personal user interface the user can activate it. Depending on where the user profile is stored the personal user interface is then downloaded to the client or transferred to the user profile server.

Menu Item Properties.

When setting up his personal interface the user can add properties to the menu items. The user can also add properties to a menu item when during a PMI session, e.g. make a menu static.

Some menu items may have unique properties based on the specific service they offer. Some properties apply to all menu items.

"dynamic" property should be enabled by default on all menus in the personal interface. This property means that the services behind the menu item should be automatically updated when the client is handed over to a new server.

If the "static" property is enabled it means that the user has chosen to always request the service behind a particular menu item from a chosen server. This means that when a static menu item will act like a WAP or WWW bookmark.

If the "always supported" property is enabled it means that the particular menu item should not disappear if the client is handed over to a new server which do not support it. The client shall in this case request the service from the last visited server supporting the menu item. This means that the client must store information about the server supporting the menu item during the hand-over procedure. In other words the particular menu item will be static as long as the current server do not support it.

Coverage Area and Cells

One of the key features with PMI is the organisation of coverage areas and cells. Each server covers a specific geographical area that is called a coverage area. The server offers location dependent information and services for its coverage area. Most of these should be accessible through the standard user interface.

There may be servers that cover a geographical area within the coverage area of a server. The coverage area of such a server is called a cell within the enclosing coverage area.

Cells may cover the entire coverage area belonging to a server.

All servers except leaf servers have cell(s) in its coverage area.

Note that a cell must be within the coverage area of the parent. Cells on the same level can not overlap each other.

Figure 3:
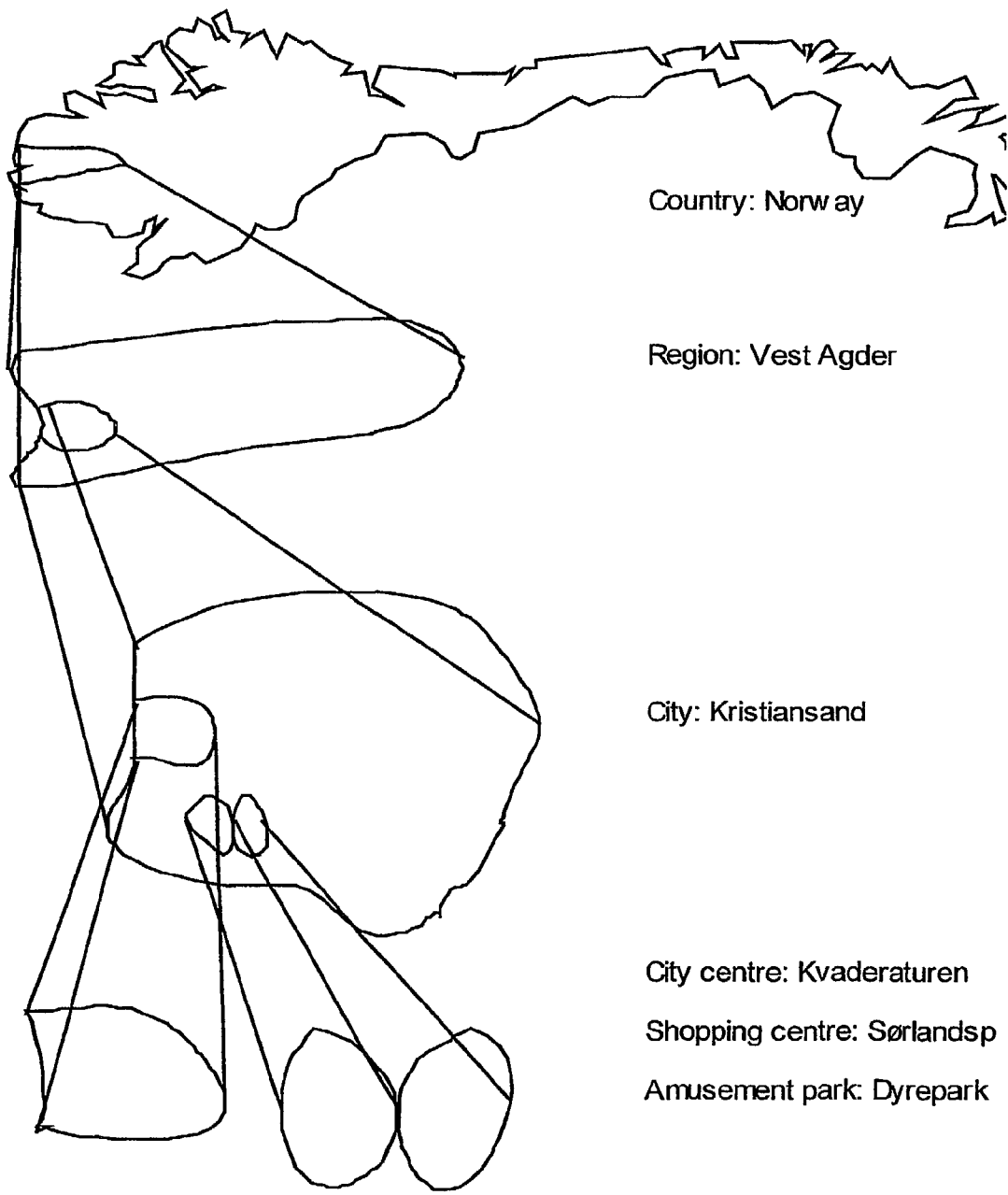
FIG. 3 illustrates concepts of coverage areas and cells of servers in an example system.

FIG. 3 shows the organisation of coverage areas (and cells) for a sub-tree of the exemplary structure depicted in FIG. 2.

Server Properties

All servers in a PMI network should run the same physical PMI server application.

The server can be adapted to implement the actual services behind the standard user interface. Optionally, the server can be adapted to forwarding the service request from the client to another server.

If the server can automatically retrieve/receive the geographical location of the client it can perform automatic hand-over of the client. Hand-over is the operation of transferring a client to the parent server or a child server. A server performs hand-over to his parent server if the user moves outside its coverage area. If the user moves into a cell the server hands the user over to the server covering the cell.

The client may also initiate a manual hand-over.

Client Properties

The client is only connected to one server at a time. No other server has knowledge about the client.

A client is dynamic if the server can get the location of the client at any time. This means that the server can perform automatic hand-over of the client.

A client is static if the location of the client is sent to the server when the user decides to do it. This means that the user must interact to initiate a hand-over.

When the client contacts a server or is handed over to a server the client transfer the user profile to the server. (Another solution is that the server may download the user profile from a specific user profile database.) The server can be adapted to inform the user of whether or not it supports the entire personal user interface. Then the user can access the subset/superset of his personal user interface.

Client-server Communication

The client-server communication can be categorised as follows:

1. Connect Sequence
   Log onto a server
   Send user profile to server if it is stored in the client
   Negotiate positioning algorithm (dynamic clients)
   Send personal user interface to client
2. Service Request Mode (the User Chooses a Menu Item)
   Send service request to server
   Send static service request to other server in a connectionless manner
3. Hand-over
   Reconnect to a new server with/without user interaction
   Send new/updated user interface to client
4. Disconnect The details of the client-server communication in each case above are described in more detail in the following, partly by way of SDL design examples.

Connecting a Client to a Server

A client may connect to any server in the network. The connect procedure is the same whether or not the client is static or dynamic. However a dynamic client may be automatically handed over to the server covering its current location as part of the connect procedure.

There are two ways of providing the server with the user profile. The procedure depends on where the user profile is stored
1. The user profile is stored in the client and is sent to the server during the connect procedure
2. The user profile is stored on a special user profile server. When a client connects to a server the server must get the user profile using the UserID In order to support static clients each server must provide the user with the possibility to connect to its parent server or its child server(s). This enables a static client to manually browse the entire network in order to find a specific server or a server covering his current location.

Connect Procedure in the Client

Figure 4:
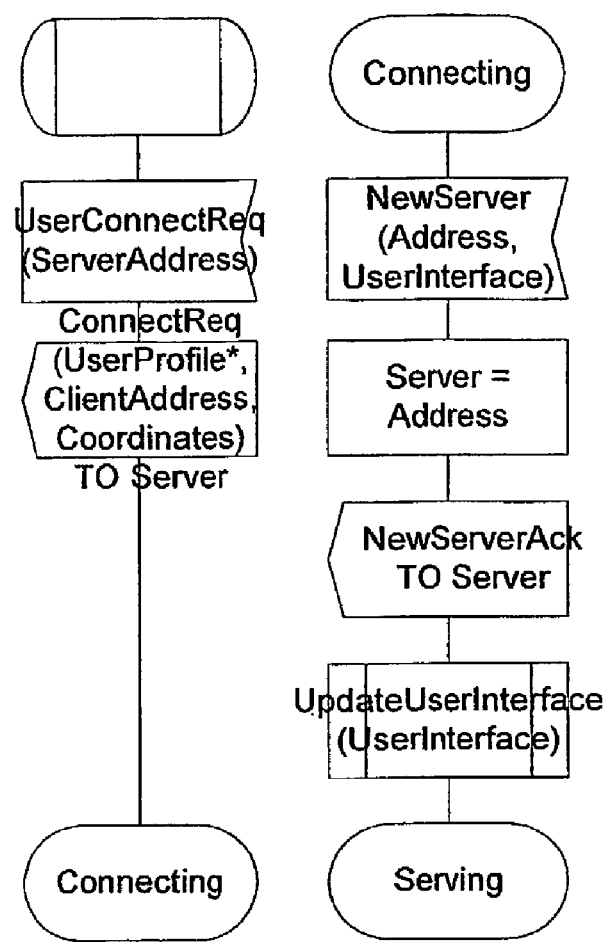
FIG. 4 illustrates an example of a connect procedure of a client connecting to a server in an example system according to an example mode.

With reference to FIG. 4 showing an SDL design of an exemplary connect procedure in the client in an example system, the principles of the connect procedure in the client are described. Important points are:
1. The user chooses to connect to a server. This is illustrated in FIG. 4 by the receiving of the UserConnectReq message
2. The connect procedure is started when the ConnectReq is sent to the server (The Connecting-NewServer transition in FIG. 4 is the same as the *-NewServer transition depicted in FIG. 9.)

Connect Procedure in the Server

Figure 5:
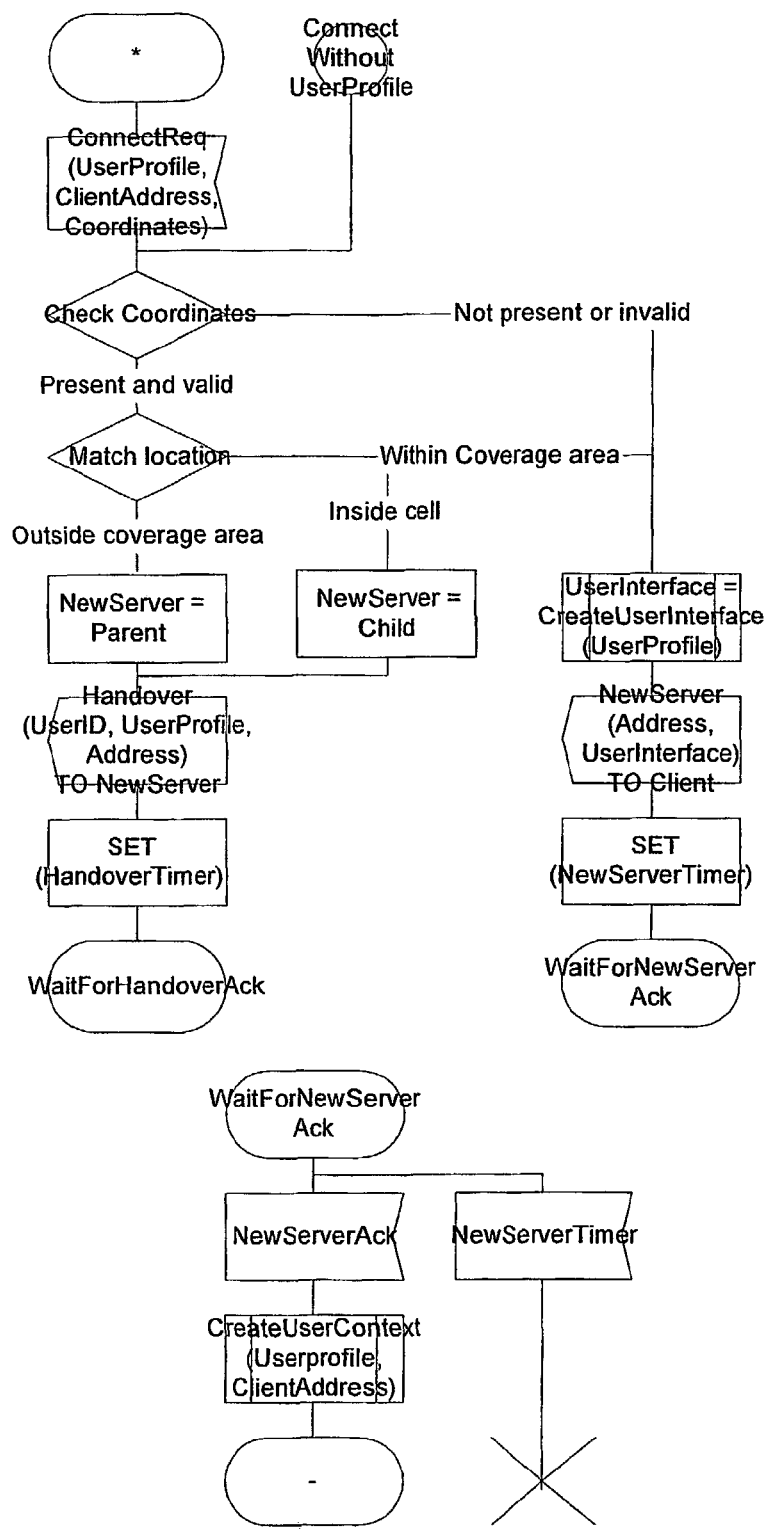
FIG. 5 illustrates an example of a connect procedure of a server in an example system.

With reference to FIG. 5 showing an SDL design of an exemplary connect procedure in the server in an example system, the principles of the connect procedure in the server are described. Important points are:
1. The server receives the ConnectReq message with client, user and optional location information from the client
2. The location information is checked for validity
3. If the location information is present and valid (dynamic client) it is compared against the coverage area and cells of the server. This procedure is the same as for the hand-over procedure to be described later under the heading "Hand-over".
4. If the user is within the coverage area of the server or the location information is not present or invalid, then the server creates a user interface based on the user profile
5. The server notifies the client that it has been connected to a new server by sending the NewServer message containing the new server address and the new user interface
6. The NewServerTimer is set in case the client do not respond
7. When the NewServerAck message is received the client has accepted the new server. A user context for the new client is created Fetching a UserProfile from Another Server.

Figure 6:
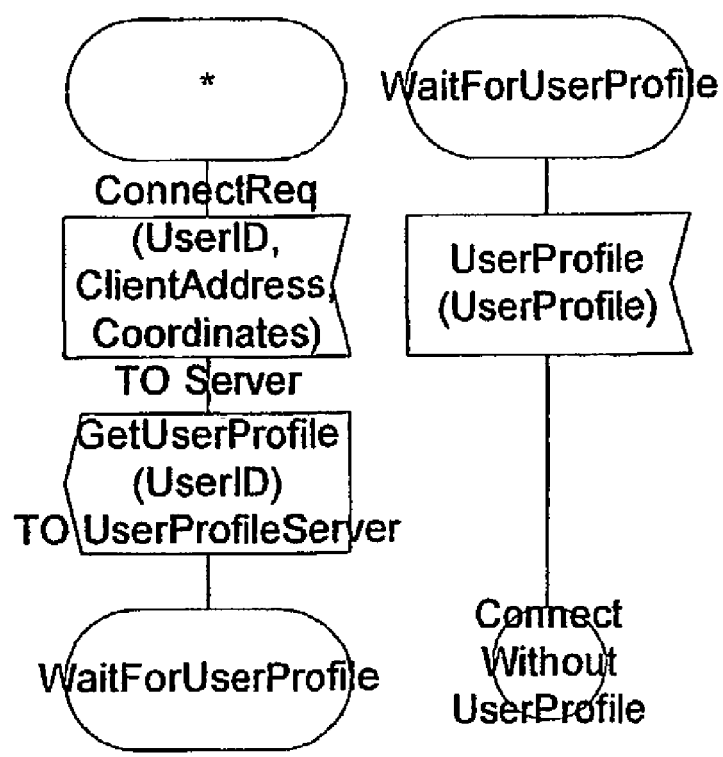
FIG. 6 illustrates an example of a server fetching the user profile from another server in an example system.

With reference to FIG. 6 showing an SDL design of an exemplary procedure in a server for fetching the user profile from another server in an example system, the principles of the procedure in a server for fetching the user profile from another server are described. Important points are:
1. The server fetches the user profile from the user profile server by sending a GetUserProfile message
2. When the user profile is received the connection procedure can proceed as described above Location Information After a client has been connected to a server there are several possibilities for providing the server with location information.

The server may get location info from:
1. the client
2. an external source
3. a combination of the client and an external source The client may provide location information from:
1. A positioning device (dynamic client)
2. User input (static or dynamic client)

Figure 7:
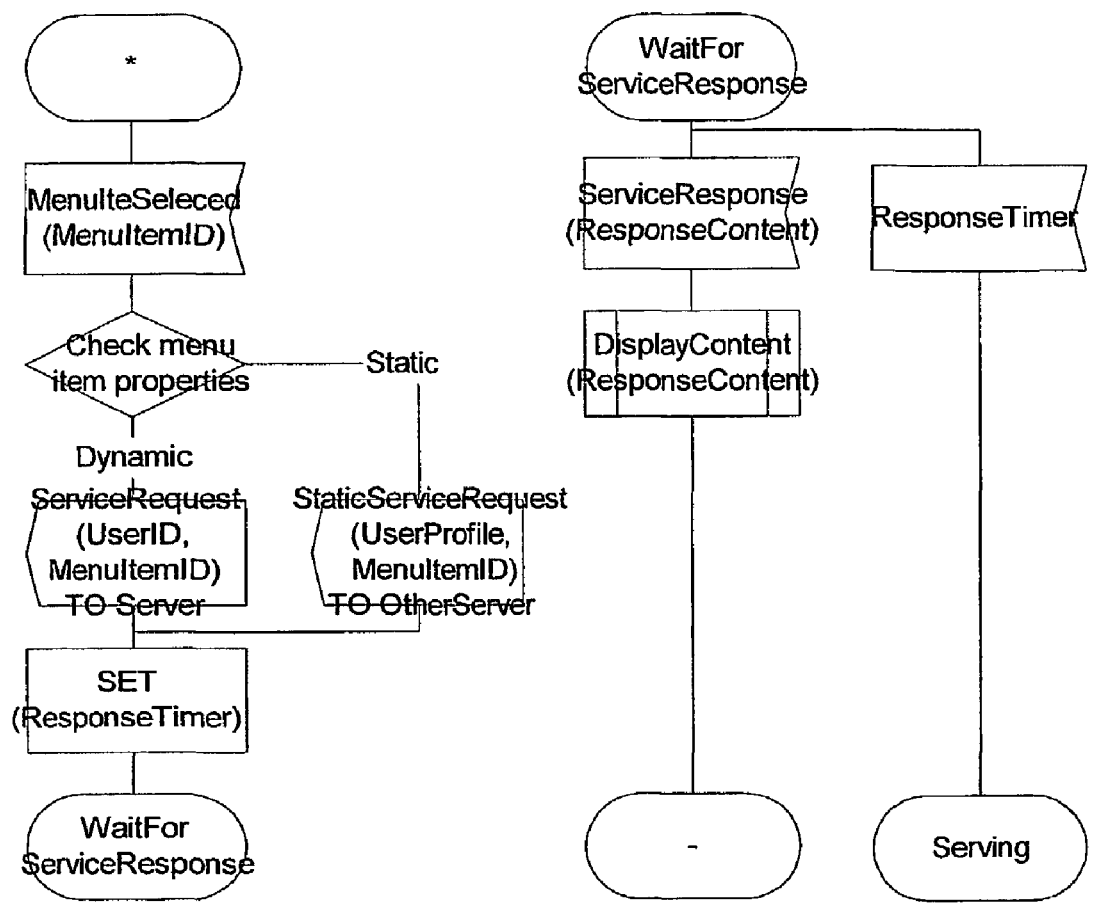
FIG. 7 illustrates an example of a service request execution in a client in an example system.
Figure 8:
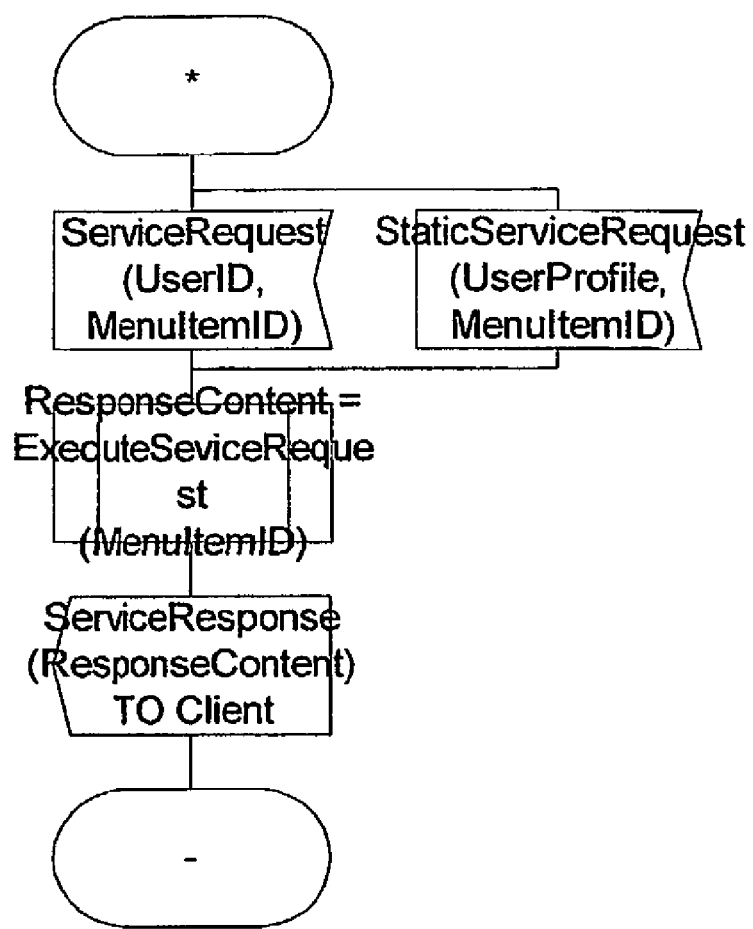
FIG. 8 illustrates an example of a service request execution in a server in an example system.

The client must not waste battery power to transmit location information that is not used by the server. This can be solved in several ways:
1. The server can respond to each Location message from the client saying when to generate and send the next message. The response message from the server can contain a certain time delay and/or the maximum distance the client can move in any direction. Calculation of a time delay and distance requires that the server keep track of the direction and speed of the client
2. The server can ask for the location when it is needed. In this case the server must keep track of the speed and direction of the client Service Requests Service requests are executed when the user selects a menu item from the user interface on the client. There are two types of service requests:
1. Service requests executed on the server which the client is currently connected to
2. Service requests executed on servers that the user is currently not connected to Reference is now made to FIG. 7, where an exemplary SDL design showing service request execution in the client covering the two types of service requests is depicted to explain the principles. Important points in this regard are:
1. The client receives user input from the MMI. This is illustrated in FIG. 7 by receiving the MenuItemSelected message
2. If the menu item is static a server address is attached to it. In order to execute the service request on another server parts of the user profile must be sent in the StaticServiceRequest message 3. If the menu item is dynamic (default) only the User ID and the Menu item ID is needed as parameters to the Service-Requestmessage
4. The ResponseTimer is set in case the service request operation fails
5. The ServiceResponse message contains response content for the requested service. From this point on mechanisms outside PMI is used in the client-server communication involved in the service request execution Reference is now made to FIG. 8, where an exemplary SDL design showing service request execution in the server is depicted to explain the principles. Important points in this regard are:
1. The server receives the ServiceRequest or StaticServerRequest message, executes the service behind the selected menu item and returns the response to the client.

Hand-over

The operation of transferring a client from one server (server A) to another server (server B) is called hand-over. A server can only hand the client over to its parent server or to a child server.

There are three situations that initiates a hand-over:
1. The client has moved out of the coverage area of the server it is currently connected to—hand-over to parent server
2. The client has entered a cell within the coverage area of the server it is currently connected to—hand-over to child server
3. The user has manually initiated a hand-over to a specific server A dynamic client is automatically handed over to another server without interaction from the user. The user having a static client must initiate a hand-over by manually entering his current geographical location, another geographic location or the specific server he wants to be handed over to.

The hand-over procedure will differ depending on how the server receive or retrieve the geographical location of the client.

Hand-over from Server when the Client Provides the Location information

In the following, exemplary SDL designs showing various aspects of the hand-over from server A to server B when the client provides the location information are employed to explain the hand-over principles.

Hand-over Procedure in Client

Figure 9:
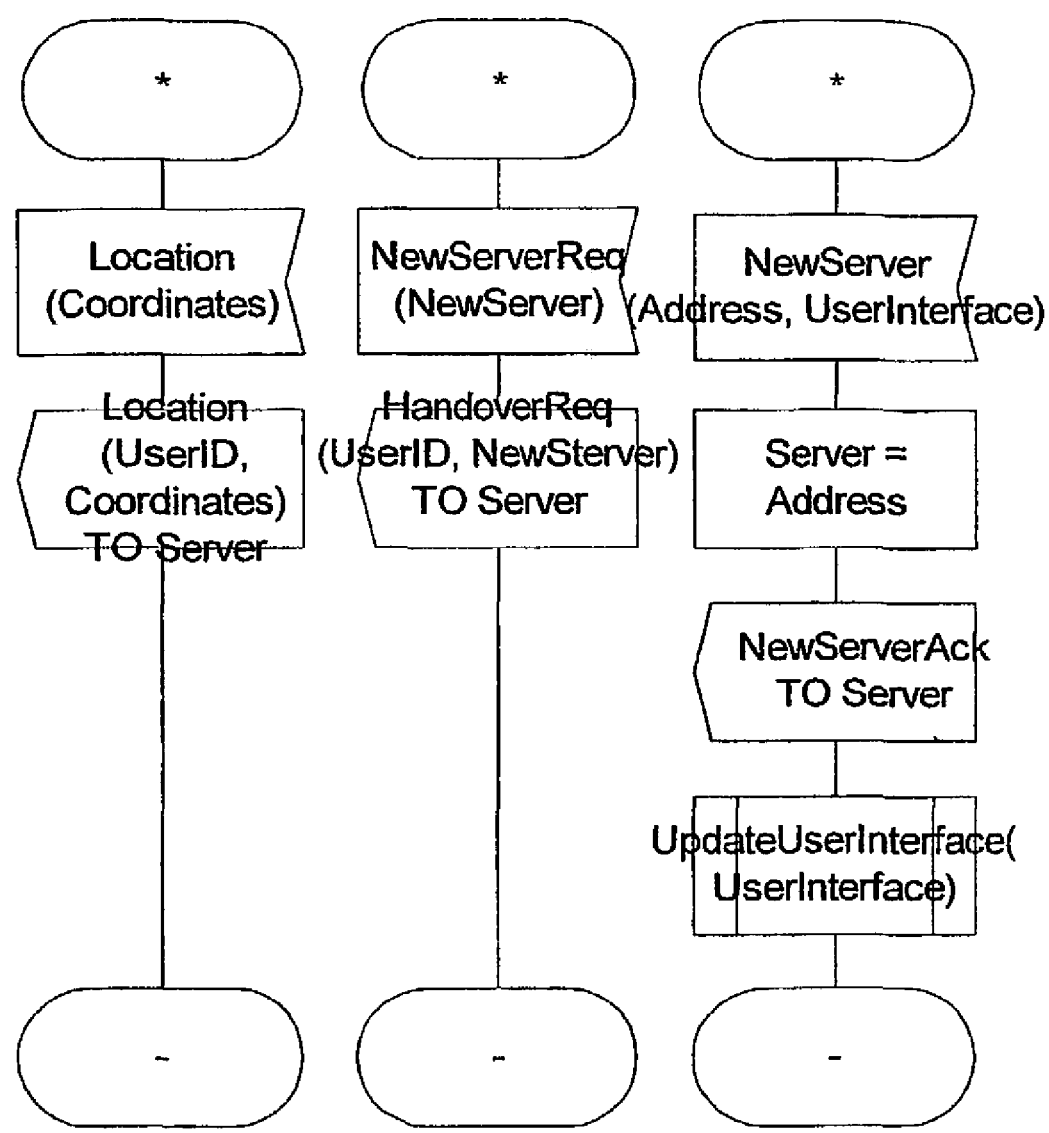
FIG. 9 illustrates an example of a hand-over procedure in a client in an example system.

Reference is made to FIG. 9, where an exemplary SDL design showing the hand-over procedure in the client is depicted to explain the principles. Important points are:
1. The client receives location information from a positioning device/entity in the mobile device and sends it to the server
2. The client receives a NewServer message if a hand-over has occurred
3. The client sends a NewServerAck message to acknowledge the changing of server
4. The NewServer message contains the address to the new server and information that is necessary in order to update the personal user interface to fit the services offered by the new server Hand-over Procedure in Server A Reference is made to FIG. 10, where an exemplary SDL design showing the hand-over procedure in the current server (server A) is depicted to explain the principles. Important points are:
1. Server A receives location information from the client
2. The received location information is compared against its coverage area and cells:
   If the client is within the coverage area no action is taken
   If the client has moved outside the coverage area it is handed over to the parent server
   If the client has moved inside a cell it is handed over to the child covering the cell (whether or not to perform this operation may depend on user profile settings)
3. If the server decides to do a hand-over it sends a Hand-over message to server B containing the UserProfile and ClientAddress of the client to be handed over.
4. The HandoverTimer is set in case the hand-over operation fails.
5. During the hand-over procedure no service requests are executed. If the hand-over is successful they are forwarded to server B, if not they are executed after the HandoverTimer has expired (Server private services can not be forwarded.)
6. When the HandoverAck message is received the user has successfully been handed over to server B. Server A can destroy all information regarding the client.

Hand-over Procedure in Server B

Figure 11:
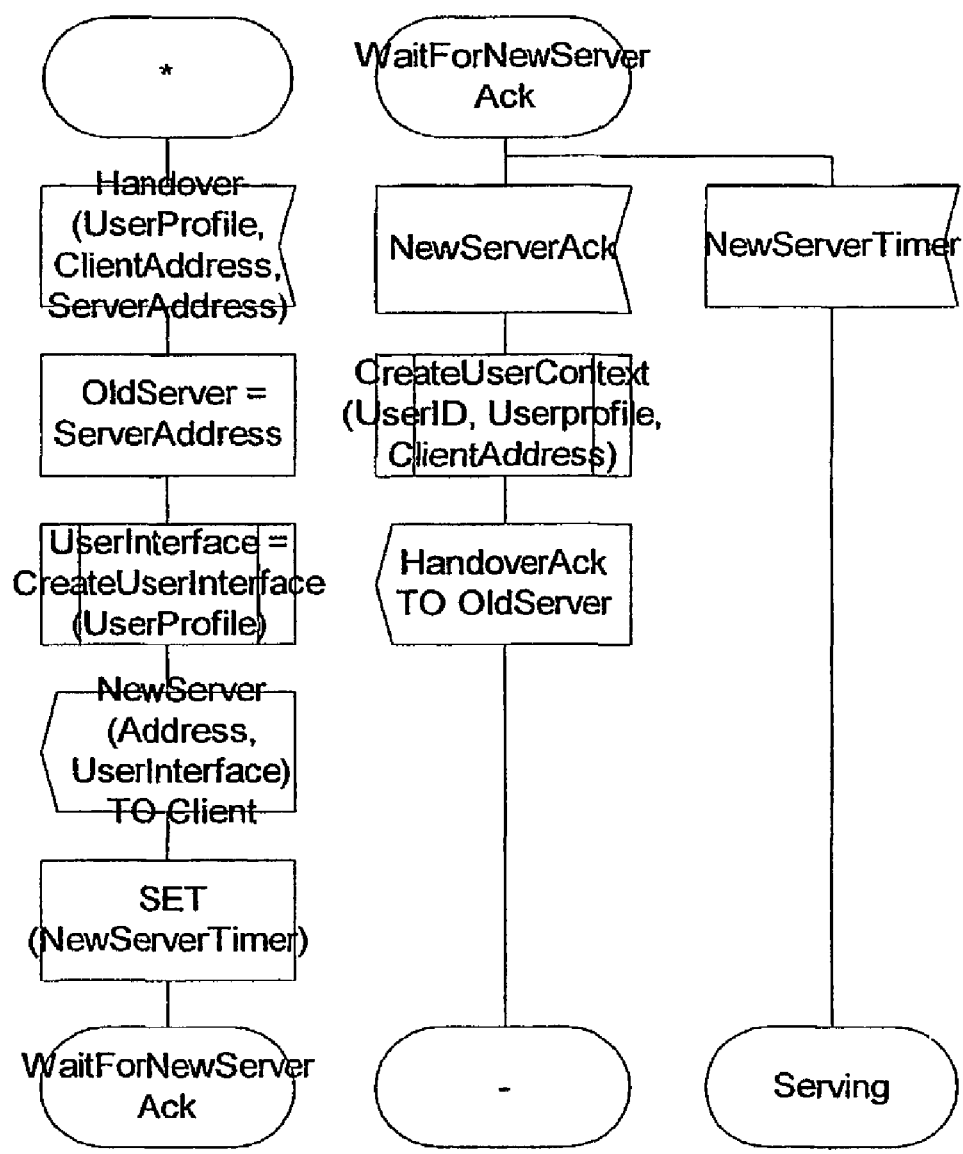
FIG. 11 illustrates an example of a hand-over procedure in server B in the exemplary system of FIG. 10.

Reference is made to FIG. 11, where an exemplary SDL design showing the hand-over procedure in the next server (server B) is depicted to explain the principles. Some important points are:
1. Server B receives a Hand-over message from server A containing information about the client and the address to server A
2. Server B creates a new personal user interface to match its available services
3. Server B notifies the client that it has been handed over to a new server by sending the NewServer message containing the new server address and the new user interface
4. The NewServerTimer is set in case the client do not respond
5. When the NewServerAck message is received the client has accepted the new server. A user context for the new client is created and a HandoverAck message is sent to the server A to confirm a successful hand-over operation Server A may receive service request from the client forwarded by B. If it does not support these messages, then an error message will be sent to the client.

Hand-over from Server A to B when the Location Information is Provided by an External Source:

In this case, the hand-over procedures are to a large extent the same as for the procedures described above, with the difference that the server retrieves and/or receives location information.

Figure 10:
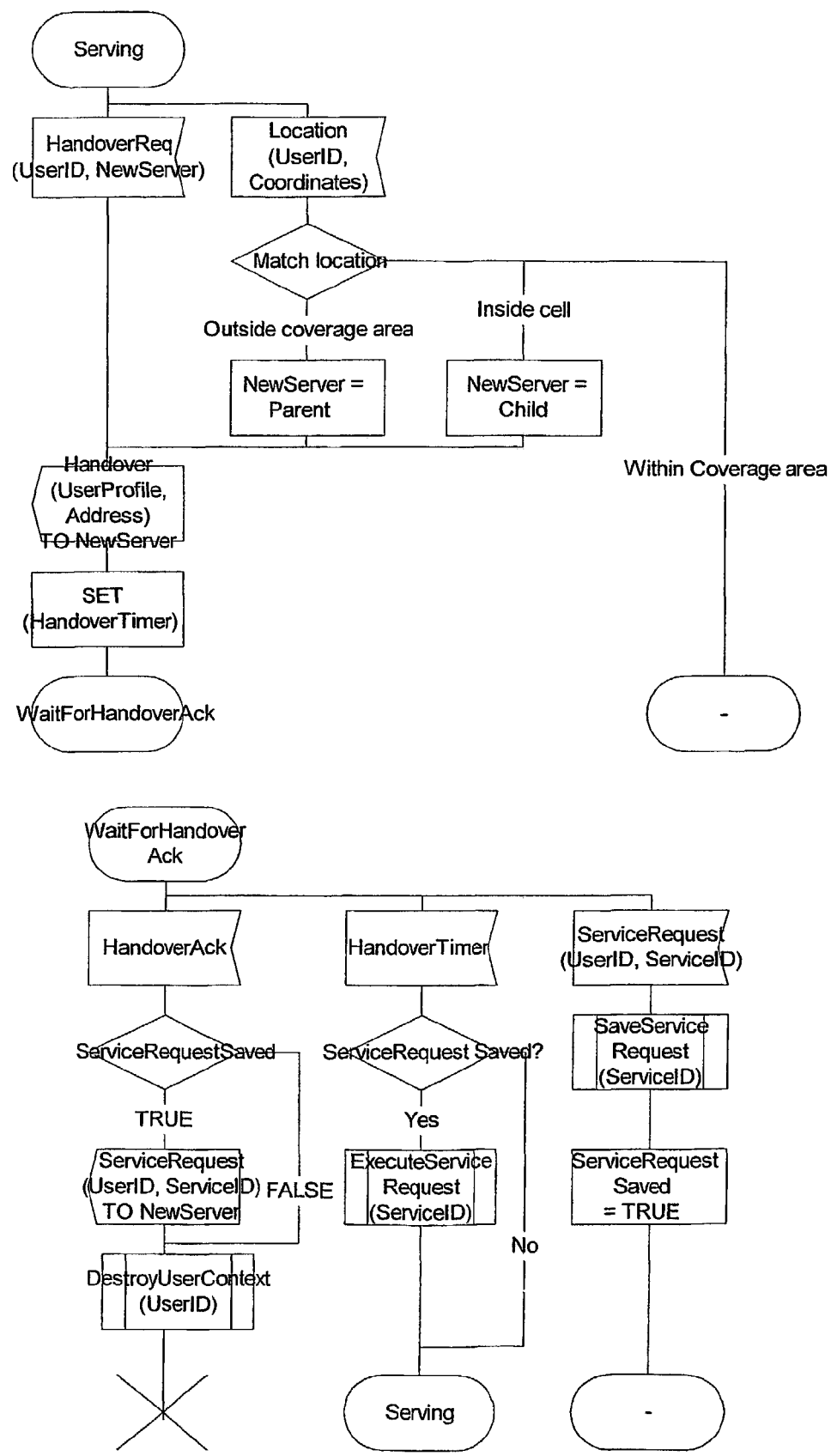
FIG. 10 illustrates an example of a hand-over procedure in server A in an exemplary system.

To explain the difference by means of the SDL diagrams for the previous case, one can take the SDL diagrams above and remove (FIG. 9) the transition regarding location in the client. Server A receives the Location message (Co-ordinates) from an external positioning device and/or entity (FIG. 10).

User Initiated Hand-over from Server A to B

User initiated hand-over is the only way to change server for a static client. A dynamic client may disable positioning and perform user-initiated hand-over as well.

Figure 12:
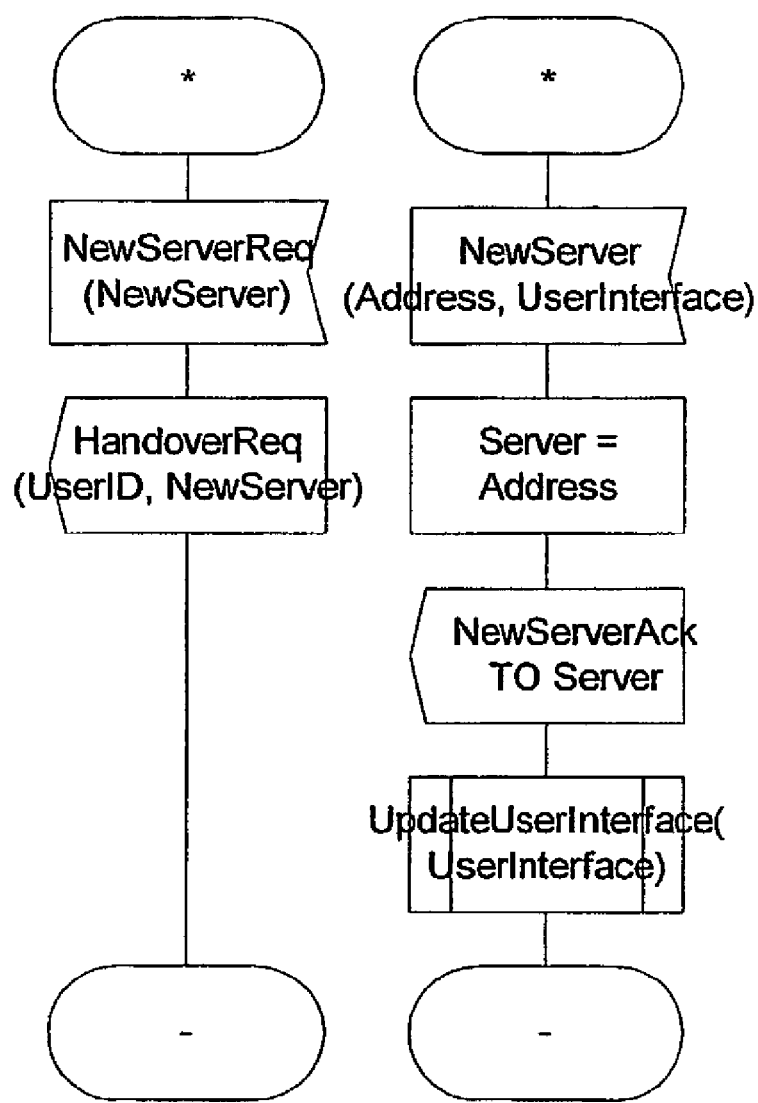
FIG. 12 illustrates an example of a user initiated hand-over procedure in a client in an example system.
Figure 14:
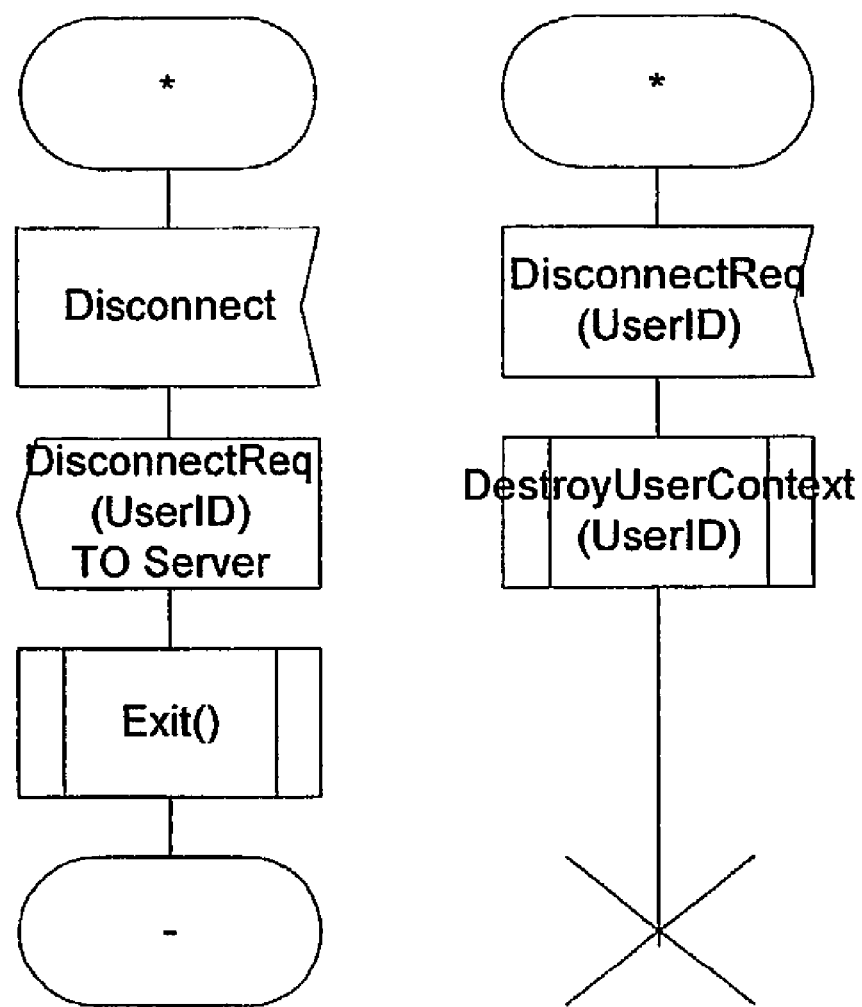
FIG. 14 illustrates an example of a disconnect procedure in a client and a server in an example system.

Reference is made to FIGS. 12 and 14, where exemplary SDL designs showing the hand-over procedures when the user chooses to be handed over to a specific server are depicted to explain the principles. Note that these figures show subsets of the SDL diagrams previously shown in FIGS. 10 and 11, but the applicable mechanism is described here.

Figure 13:
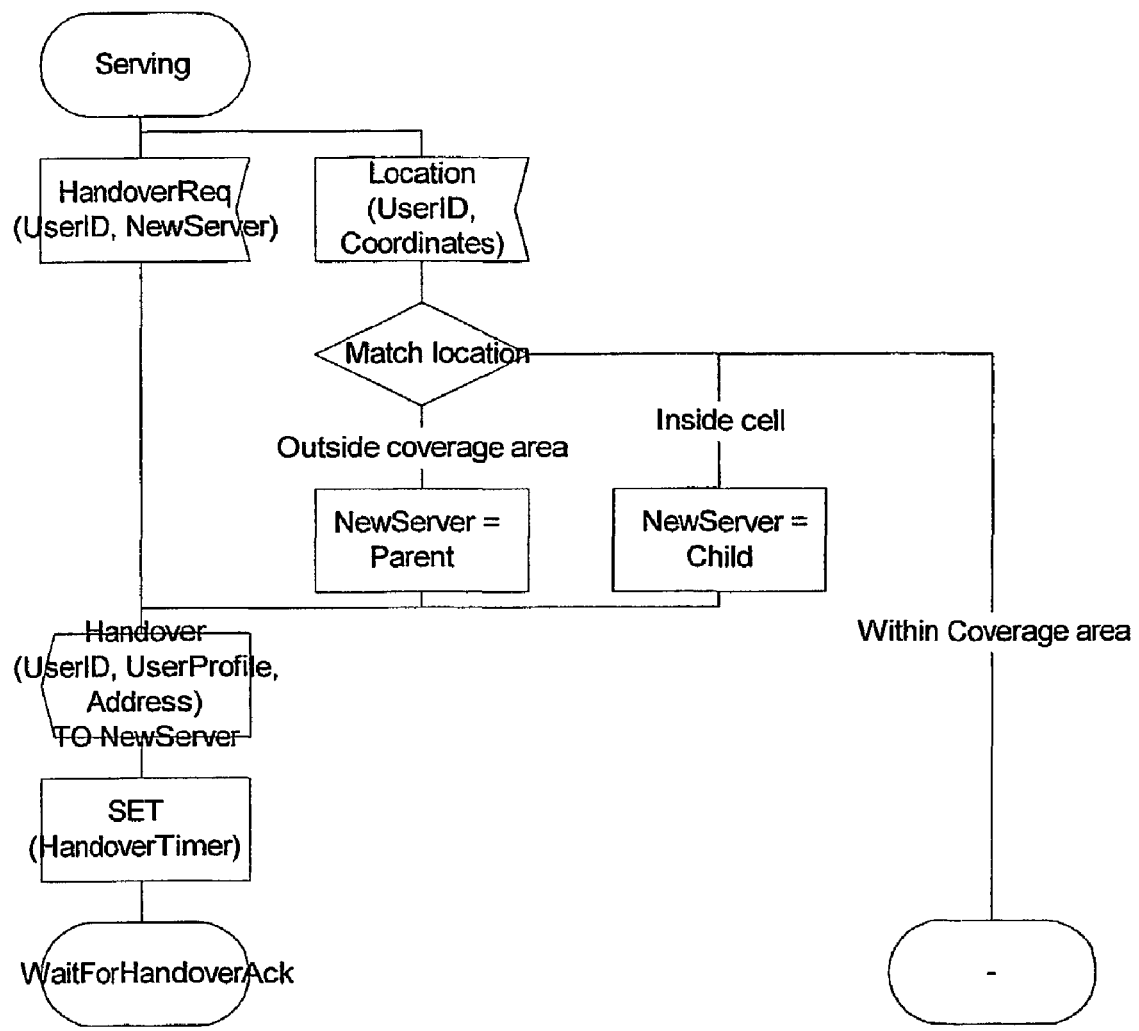
FIG. 13 illustrates an example of a user initiated hand-over procedure in server A in the exemplary system of FIGS. 10 and 11.

Firstly, Reference is made to FIG. 12, where an exemplary SDL design showing the user initiated hand-over procedure in the client is depicted to explain the principles. Some important points are:
1. The user chooses a new server. This is illustrated in FIG. 12 by receiving the NewServerReq message
2. The hand-over operation is started when the HandoverReq is sent to the server the client is currently connected to
3. The client receives a NewServer message if a hand-over has occurred
4. The client sends a NewServerAck message to acknowledge the changing of server
5. The NewServer message contains the address to the new server and information that is necessary in order to update the personal user interface to fit the services offered by the new server Next, reference is made to FIG. 13, where an exemplary SDL design showing the user initiated hand-over procedure in the current server (server A) is depicted to explain the principles. Some important points are:
1. Server A receives the HandoverReq message from the client
2. A Hand-over message to server B containing the UserID, UserProfile and ClientAddress of the client to be handed over
3. The HandoverTimer is set in case the hand-over operation fails The rest of the procedure applicable to this section is covered by the previous SDL diagrams and description related to FIGS. 10 and 11.

Disconnect:

The user may at any time exit the client application. In this case the server should be notified and the user context should be destroyed.

In some cases the client will not be able to perform the disconnect procedure. This means that the server should implement an "inactivity timer". This means that the server will automatically remove a user context after a specific time when there has been no interaction with the specific client.

Now, reference is made to FIG. 14, where an exemplary SDL design showing the disconnect procedure in the client and the server is depicted to explain the principles. Some important points are:
1. The user chooses to disconnect the current PMI connection. This is illustrated in FIG. 14 by receiving the Disconnect message
2. A DisconnectReq message is sent to the Server
3. The client application is terminated
4. The Server receives the DisconnectReq message from the client and destroys the user context Advantages PMI can easily be realised in software. There is no specific hardware demands connected to its function. Underlying functionality like positioning may require special hardware.

PMI needs functionality from underlying technology for:
Connecting the PMI servers to each other in a WAN
The Internet
Information Transfer
WSP (WAP)
HTTP
Information formatting/language
WML (WAP)
XML
HTML
Positioning (dynamic clients)
GSM positioning
GPS If the PMI network is based on WAP it may be implemented in a way that makes it possible for all WAP compatible phones to be a PMI client.

The main advantage with PMI is that it is simple. It should be no problem to extend it to future requirements and technology. This also means that it should be possible to implement the PMI server and make a world-wide PMI network right now!

A world-wide PMI network means that the user is able to use his personal portal no matter where in the world he is! The links attached to the menu items in his personal portal will automatically change as the user change geographical location, but only if the user has configured them to be dynamic.

The roll out of a world-wide PMI network can be done in few steps:
1. Set up a root server covering the whole world
2. Register five or more cells on the root that covers the parts of the world and set up the corresponding servers
3. Register a cell and set up a server for each country on the corresponding world part server
4. Sell the PMI server application to companies with commercial interest and offer cell registration on the country servers. Servers on this level and below is the most important servers because they offer the services that the user sets up in his personal portal After step 4 it is just to wait for the network to grow into a world-wide network for location dependent services. This will happen because all information and service providers want to be a part of a network where their "customers" easily can access their services. Today it is a big job for a service provider to make their WWW or WAP server visible, especially if their services are location dependent. Buying a PMI server and hooking it on the PMI network solves all these problems!

Dynamic PMI clients are only possible when positioning supported by the mobile phone or network is available. Still static PMI clients is a very good alternative compared to how WWW and WAP servers are accessed today.

Each PMI server may of course offer services that is not part of the standard interface. The user should be able to set up in the user profile whether or not he wants to see server private services in his user interface.

The user may of course "bookmark" services on certain servers. If these services are part of the standard user interface they will become static. I they are not part of the standard user interface they will always be accessed as if the client is static.

The personal portal is more than a menu hierarchy. When moving around in a car, bus, train or by foot each PMI server may provide a voice message (played via BT headset) or a popup text message describing the coverage area of the server (country, city, shopping centre, zoo, amusement park etc.). This could be an option in the standard user interface.

Broadening:

The information provided by the PMI servers is also interesting for non-mobile Internet users. This open for the possibility that a user can visit a city, shopping centre etc. from his home PC. The PMI server will not distinguish between a client running on a PC or a mobile phone user as long as they have been connected as static users.

The servers may of course offer special information services that are not covered by the standard user interface. The user can choose in the user profile whether or not he wants server private information and services.

The invention claimed is:

1. A client-server based information or service system for providing location dependent information or services to operating mobile clients, said systems comprising:
   a plurality of stationary servers arranged at levels in a hierarchical ordered tree shaped network, said hierarchical ordered network levels being arranged to include at least an uppermost root level and a lowermost leaf level, and optionally an intermediate branch level, wherein each of said servers are arranged to provide information or services corresponding to a predefined specific geographical area, said geographical area being non-overlapping with respect to geographical areas corresponding to adjacent servers on the same network hierarchy level, said geographical area being subdividable to comprise geographical areas corresponding to servers on lower network hierarchy levels, and
   said operating mobile client having an association with only one of said servers at a time, the association being transferable between adjacent servers of the tree shaped network on an existing connection of a client to the network, whereby a mobile client user obtains automatically or on user request information or services of interest pertaining to the specific geographical area of the corresponding server with which the mobile client currently has an association.

2. A system according to claim 1, wherein a user of a mobile client communicates with the server by means of a personal user interface transferred from the server to the client upon establishment of the association.

3. A system according to claim 1, wherein the association of a mobile client with a server is dependent on user location information provided to any server by the client or a separate source of user location information.

4. A system according to claim 2, wherein the personal user interface is derived, by the server, from a standard user interface or a subset of a standard user interface held in the server, by applying a user profile to the standard user interface.

5. A system according to claim 2, wherein the personal user interface comprises at least a multi-level menu of information or service item identifiers selectable by a client user.

6. A system according to claim 1, characterised in that the client is a viewer application adapted to a standard protocol such as WWW or WAP, and the user interface is a collection of hyperlinks presented to the user by means of the viewer application, each hyperlink constituting an information or service request being sent to an associated server when selected by the user.

7. A system according to claim 3, wherein the association of a client with a current server is transferred to a next server when the user location information indicates that the user relocates from a location within the coverage area of the respective current server to a location within the coverage area of the next server.

8. A system according to claim 4, characterised in that the user profile includes a personal user interface specification and at least one of a user identification, a user name or a telephone number, and
   the user profile is stored with the client or a special user profile server.

9. A system according to claim 1, characterised in that a server node at the root level can have no parent servers and any number of child servers, a server node at the branch level can have one parent server and any number of child servers, and a server node at the leaf level can have one parent server and no child servers.

* * * * *

UNITED STATES PATENT AND TRADEMARK OFFICE
CERTIFICATE OF CORRECTION

| | | |
|---|---|---|
| PATENT NO. | : 7,243,164 B2 | Page 1 of 1 |
| APPLICATION NO. | : 10/312844 | |
| DATED | : July 10, 2007 | |
| INVENTOR(S) | : Vegge | |

It is certified that error appears in the above-identified patent and that said Letters Patent is hereby corrected as shown below:

In Column 3, Line 28, above "NETWORK TOPOLOGY", insert -- DETAILED DESCRIPTION --.

In Column 3, Line 29, delete "NETWORK TOPOLOGY" and insert -- Network Topology --, therefor.

In Column 5, Line 64, insert -- The --, before ""dynamic"".

Signed and Sealed this

Twentieth Day of May, 2008

JON W. DUDAS
*Director of the United States Patent and Trademark Office*